United States Patent
Gupta et al.

(10) Patent No.: US 10,771,848 B1
(45) Date of Patent: Sep. 8, 2020

(54) ACTIONABLE CONTENTS OF INTEREST

(71) Applicant: Alphonso Inc., Mountain View, CA (US)

(72) Inventors: Manish Gupta, Bangalore (IN); Lampros Kalampoukas, Brick, NJ (US); Raghavendra Koushik, Bangalore (IN); Subbhaash S, Bangalore (IN)

(73) Assignee: Alphonso Inc., Mountain View, CA (US)

(*) Notice: Subject to any disclaimer, the term of this patent is extended or adjusted under 35 U.S.C. 154(b) by 0 days.

(21) Appl. No.: 16/299,938

(22) Filed: Mar. 12, 2019

Related U.S. Application Data (60) Provisional application No. 62/789,139, filed on Jan. 7, 2019.

(51) Int. Cl.
| | |
|---|---|
| H04N 5/445 | (2011.01) |
| H04N 21/462 | (2011.01) |
| H04N 21/8545 | (2011.01) |
| H04N 21/482 | (2011.01) |
| H04N 21/44 | (2011.01) |

(52) U.S. Cl.
CPC .......... H04N 21/462 (2013.01); H04N 21/44 (2013.01); H04N 21/482 (2013.01); H04N 21/8545 (2013.01)

(58) Field of Classification Search
CPC .. H04N 21/482; H04N 21/48; H04N 21/4821; H04N 21/4345; H04N 21/4316; H04N 21/47214; H04N 21/4622
See application file for complete search history.

(56) References Cited

U.S. PATENT DOCUMENTS

| | | | |
|---|---|---|---|
| 9,253,533 B1* | 2/2016 | Morgan | H04N 21/44008 |
| 9,465,435 B1* | 10/2016 | Zhang | G06F 3/01 |
| 9,602,795 B1* | 3/2017 | Matias | G11B 27/105 |
| 9,628,836 B1 | 4/2017 | Kalampoukas et al. | |
| 10,108,718 B2 | 10/2018 | Kalampoukas et al. | |
| 2003/0126599 A1* | 7/2003 | Novak | G11B 27/105 |
| | | | 725/32 |

(Continued)

OTHER PUBLICATIONS

Attribution modeling overview—Analytics Help. Printout from web page: <https://support.google.com/analytics/answer/1662518?hl=en>, printout out date: Dec. 27, 2018, original posting date: unknown, 2 pages.

(Continued)

*Primary Examiner* — Annan Q Shang
(74) *Attorney, Agent, or Firm* — Panitch Schwarze Belisario & Nadel LLP

(57) ABSTRACT

Methods and systems are provided to create a media consumer-personalized database table of selectable actions related to media content of interest to a media consumer that is being displayed on a media device. The media content of interest is identified by the media consumer by recording an indication of the media content of interest via a signal received from a user input device when the media content of interest is being displayed or presented. The database table of selectable actions is then presented to the media consumer who can initiate one of the actions.

28 Claims, 7 Drawing Sheets

(56) References Cited

U.S. PATENT DOCUMENTS

| | | | | |
|---|---|---|---|---|
| 2005/0149987 | A1* | 7/2005 | Boccon-Gibod | H04N 5/782 725/135 |
| 2005/0210145 | A1* | 9/2005 | Kim | H04N 21/4786 709/231 |
| 2009/0249233 | A1* | 10/2009 | Boyles | G06F 3/0481 715/764 |
| 2009/0300677 | A1* | 12/2009 | Zalewski | H04H 20/28 725/38 |
| 2009/0328122 | A1* | 12/2009 | Amento | H04N 7/17318 725/114 |
| 2010/0017474 | A1* | 1/2010 | Kandekar | H04N 7/17318 709/205 |
| 2011/0075990 | A1* | 3/2011 | Eyer | H04N 21/4722 386/241 |
| 2011/0126252 | A1* | 5/2011 | Roberts | H04N 7/17318 725/114 |
| 2011/0138326 | A1* | 6/2011 | Roberts | H04N 21/812 715/808 |
| 2012/0042343 | A1* | 2/2012 | Laligand | H04N 21/234336 725/53 |
| 2013/0031582 | A1* | 1/2013 | Tinsman | H04N 21/2353 725/36 |
| 2014/0072277 | A1* | 3/2014 | Takao | G06Q 10/109 386/239 |
| 2014/0237510 | A1* | 8/2014 | Phillips | H04N 21/4782 725/34 |
| 2014/0366065 | A1* | 12/2014 | Hattori | H04N 21/454 725/45 |
| 2014/0369668 | A1* | 12/2014 | Onoda | H04N 21/654 386/248 |
| 2015/0161658 | A1 | 6/2015 | Little et al. | |
| 2015/0245103 | A1* | 8/2015 | Conte | G06Q 30/0643 725/60 |
| 2015/0365725 | A1* | 12/2015 | Belyaev | H04N 21/8133 725/46 |
| 2016/0037217 | A1* | 2/2016 | Harmon | H04N 21/45457 725/9 |
| 2016/0110577 | A1* | 4/2016 | Havens | G06K 7/10732 235/440 |
| 2016/0125889 | A1 | 5/2016 | Westerman | |
| 2017/0213237 | A1 | 7/2017 | Yadagiri et al. | |
| 2017/0337276 | A1 | 11/2017 | Obenzinger | |
| 2017/0372347 | A1 | 12/2017 | Li et al. | |
| 2018/0232264 | A1 | 8/2018 | Curcio et al. | |
| 2019/0082226 | A1* | 3/2019 | Ramamurthy | H04N 21/4394 |
| 2019/0230387 | A1* | 7/2019 | Gersten | H04N 21/854 |

OTHER PUBLICATIONS

Clickable Video at Overlay TV: we make video click. Printout from web page: <http://overlay.tv/>, Overlay TV Holdings Ltd, printout date: Feb. 25, 2019, original posting date: unknown, 3 pages.

* cited by examiner

Figure 2A-2 video content database 40

| Identifier of video content | Type of video content | Description of video content | Primary Metadata (Content Details) | Secondary Metadata (Content Details) | Actions | Attribution Entity |
|---|---|---|---|---|---|---|
| 112222233 | Program | Saturday Night Live Season 44, Episode 5 | Saturday Night Live Season 44, Episode 5 | comedy<br>New York | • Find a rerun<br>• Record a rerun<br>• Share | Channel that aired the video content |
| 456722211 | Commercial | Nike Classic Cortez | Brand: Nike<br>Product: Nike Classic Cortez | sneakers | • Shop<br>• Read Reviews<br>• Post Reviews<br>• Share | Ad campaign |
| 557832342 | Commercial | Volkswagon T-Roc | Brand: Volkswagon<br>Product: T-Roc | vehicle<br>SUV | • Shop<br>• Read Reviews<br>• Post Reviews<br>• Share<br>• Book Test Drive | Ad campaign |
| 352299942 | Movie | Gone with the Wind | Gone with the Wind<br>Scarlett O'Hara/Vivien Leigh<br>Ashley Wilkes/Leslie Howard<br>Rhett Butler/Clark Gable | Drama<br>Civil War | • Record future showing<br>• Share<br>• Shop<br>• Find IMDb review | Channel that aired the video content |
| . . . | | | | | | |

ACTIONABLE CONTENTS OF INTEREST

CROSS-REFERENCE TO RELATED APPLICATIONS

This application claims priority to U.S. Provisional Patent Application No. 62/789,139 filed Jan. 7, 2019, which is incorporated by reference herein.

BACKGROUND OF THE INVENTION

Many interactive TV features have been developed that allow for real-time interactivity with video content as it is being displayed on the TV. One example is voting/polling of audience responses during a program (e.g., viewer voting during the television reality game show, Big Brother™ that airs in the United States on CBS). Another example is an e-commerce application that allow a viewer to shop for and purchase items shown on the TV screen (e.g., interactive overlay technology, such as Overlay.TV®, commercially available from OverlayTV Inc). However, viewers often do not want to take any immediate action while watching TV because taking such action distracts from the viewing enjoyment. Also, even if the viewer is interested in taking an available action, the viewer may not be ready to take the action when the TV program makes the action available for selection. Furthermore, current interactive TV features are limited in the types of actions that can be taken.

Accordingly, there is a need to provide a new paradigm of interactive TV regarding how types of actions related to TV content being viewed are managed and selected. The present invention fulfills such a need.

SUMMARY OF THE PRESENT INVENTION

Methods and systems are provided to create a media consumer-personalized database table of selectable actions related to media content of interest to a media consumer that is being displayed on a media device. The media content of interest is identified by the media consumer by recording an indication of the media content of interest via a signal received from a user input device when the media content of interest is being displayed or presented. The database table of selectable actions is then presented to the media consumer who can initiate one of the actions.

BRIEF DESCRIPTION OF THE DRAWINGS

Preferred embodiments of the present invention will now be described by way of example with reference to the accompanying drawings:

FIGS. 2A-1 and 2A-2, taken together, is a schematic diagram of a system for implementing preferred embodiments of the present invention.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

media content—Media content is the information and experiences that are directed towards an end-user or audience, namely media consumers. In the context of the present invention, the media content is delivered via a media device and primarily includes program type content and commercials. The media content may come from (i) a conventional broadcast TV signal, typically delivered over a cable or fiber optic network via a set top box, CableCARD® or the like to a TV, (ii) an over-the-air (OTA) broadcast TV signal, or (iii) streaming services that deliver audio and/or audiovisual content to a device that is connected to a viewer's home network. The media content includes audio or audiovisual content, and thus may be any content in a video data stream or an audio data stream.

media device—A media device is any device that outputs media content, such as a television, radio, or computer. A media device thus allows for consumption of media content. Examples of media devices that output both video-based media content and audio-based media content include a smart TV, and a smart multi-media player device.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audio-visual stream" since a video data stream typically includes audio.

audio data stream—An audio data stream includes (i) a conventional broadcast audio signal, such as AM/FM or satellite radio, or (ii) streaming services that deliver audio content to a user's device that is connected to a network.

video content—Video content refers to the content of the video data stream. Two main categories of video content include "program type content" (e.g., a TV show) and commercials.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content."

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour.

metadata—Metadata, by definition, is data (information) that provides information about other data. The metadata described below is generally "descriptive metadata," which by definition, describes a resource for purposes such as discovery and identification. It can include elements such as title, abstract, author, and keywords. More specifically, the metadata described below is metadata related to specific TV content. The metadata includes both "primary metadata" and "secondary metadata" (described below). Metadata are also referred to as "tags."

primary metadata—In the case of a TV program, "primary metadata" is metadata regarding the TV program that directly identifies the TV program, such as the title, and the season and episode in the case of a recurring TV program series. Other objective data regarding the TV program may be part of the metadata, such the actors, and network airing the TV program. In the case of a movie, the "primary metadata" may include similar information, such as the movie title and actors. In the case of a commercial, the "primary metadata" is metadata that directly identifies the product and/or brand being advertised in the commercial. Typically, the primary metadata identifies an entity that is associated with the sponsor of the commercial.

secondary metadata—"Secondary metadata" is any other metadata regarding the TV program, movie, or commercial other than the primary metadata. For example, in a TV program, "Curb Your Enthusiasm" is primary data, whereas "comedy" (genre) or "Los Angeles" (where it is primarily filmed) may be secondary metadata. In an advertisement for a Toyota vehicle, "Toyota" is primary metadata, wherein "car," "vehicle," or "SUV" may be secondary metadata. Secondary metadata for commercials may even include specific promotional tags, such as "financing deal" or "holiday sale."

action (also, referred to interchangeably as "selective action")—an action is an activity that can be taken which is related in some manner to a particular video content. Multiple actions may be selectable for a particular video content. As described in more detail below, there are specific actions which are relevant to the type of video content (e.g., commercial, TV program, movie, music, news). Other specific actions are relevant to the product and/or brand of the video content, particularly, when the video content is a commercial. Some examples of actions include the following:

1. Find the product advertised on the internet.
2. Prompt if the same TV show/episode is scheduled again on any of channels that I subscribe to.
3. Find the same movie on Netflix.
4. Post my comments on social network, or product review sites
5. Book an appointment for test-drive
6. Book an appointment with the doctor video display device—A video display device is the device that the viewer uses to experience the video content 14. Examples of a video display device include a smart TV, or a smart multi-media player device, such as a tablet or a smartphone. A smart TV is a television set with integrated Internet capabilities that offers more advanced computing ability and connectivity than a contemporary basic television set. Smart TVs and smart multi-media player devices are also referred to as "information appliances," and often allow the user to install and run more advanced applications or plug-ins/add-ons based on a specific platform. Smart TVs and smart multi-media player devices run a complete operating system (OS) or mobile OS software that provides a platform for application developers.

external entity—an external entity is an entity that is remote from the video display device, and which allows the video display device to extend its native functionality via selectable actions which require communicating with the external entity. Examples of an "external entity" include a web server of a search engine (e.g., GOOGLE), a social media web server (e.g., FACEBOOK® server), an e-commerce server (e.g., AMAZON® server), and a server of a cable service that provides access to an electronic program guide (EPG).

device identifier (device ID)—a device ID is equivalent to a "MAC address" or "physical address" which is unique for every device. The device may be a mobile device. A device ID is typically fixed, but in the case of mobile devices, their device ID's are now user-resettable. A sample device ID (ESN/IMEI/MEID) for an iphone 5 is: 990002286593860. Smart TV's, and smart multi-media player devices also have unique device ID's.

II. Overview of Preferred Embodiments

Figure 1A:
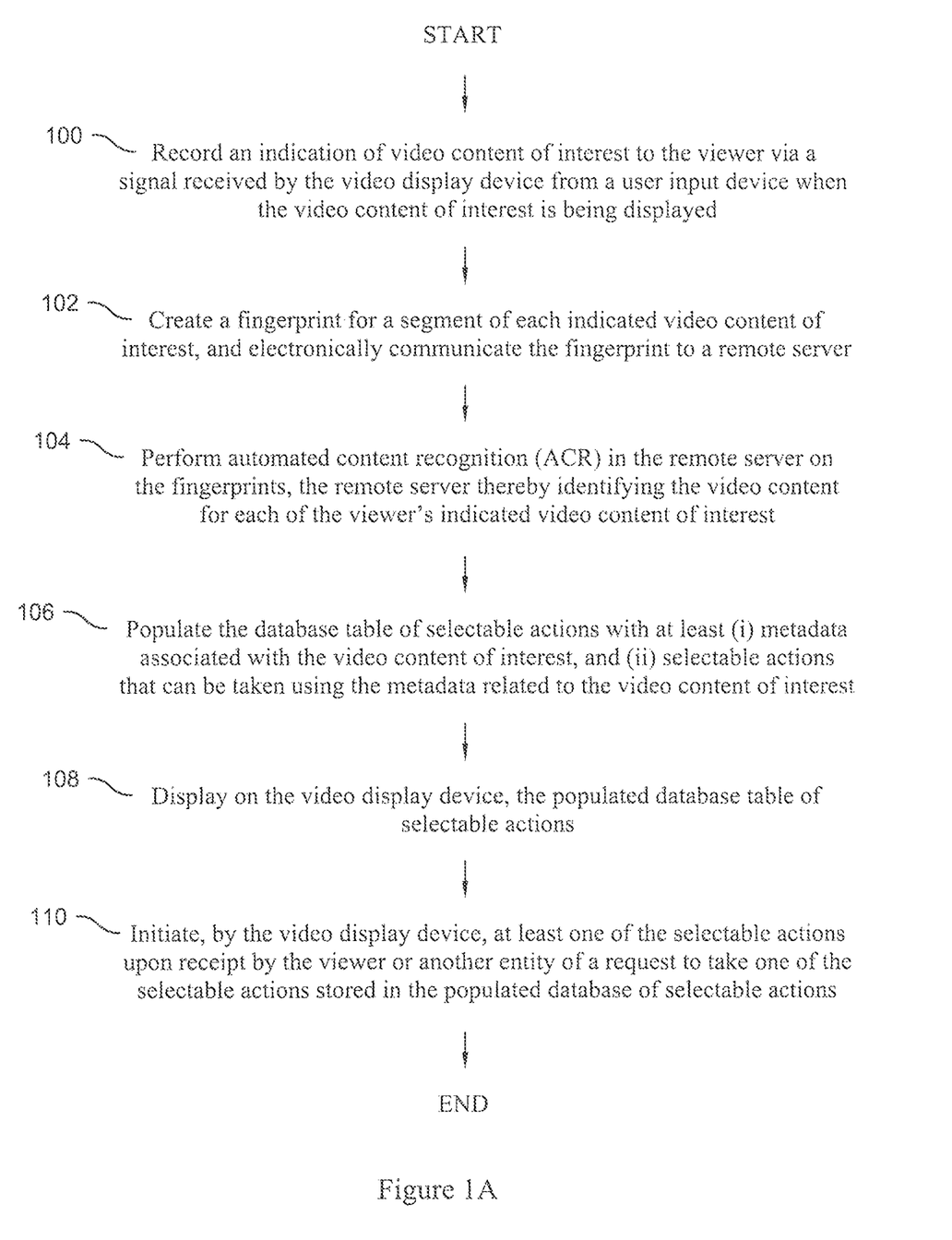
FIGS. 1A and 1B are flowcharts for implementing preferred embodiments of the present invention.

FIG. 1A shows a flowchart of one preferred embodiment of the present invention which provides an automated method of creating a viewer-personalized database table of selectable actions related to video content of interest to a viewer that is being displayed on a video display device, and then allows the viewer to use the database table of selectable actions to initiate an action. The video content database maintains (i) an identifier of video content that is broadcast or streamed to a plurality of video display devices, and (ii) metadata associated with the video content. In one preferred embodiment, the method operates as follows:

STEP 100: Record, by the video display device, an indication of video content of interest to the viewer via a signal received by the video display device from a user input device when the video content of interest is being displayed.

STEP 102: Create a fingerprint, by a fingerprint processor, for a segment of each indicated video content of interest, and electronically communicating the fingerprint to a remote server.

STEP 104: Perform automated content recognition (ACR) in the remote server on the fingerprints, the remote server thereby identifying the video content for each of the viewer's indicated video content of interest by its respective identifier.

STEP 106: Populate, by the remote server that is in electronic communication with the video content database, the database table of selectable actions with at least the following items for each indicated video content of interest:

(i) the metadata associated with the video content of interest, and (ii) selectable actions that can be taken using the metadata related to the video content of interest.

STEP 108: Display, on the video display device, the populated database table of selectable actions, preferably, upon request by the viewer to view selectable actions.

STEP 110: Initiate, by the video display device, at least one of the selectable actions upon receipt by the viewer or another entity of a request to take one of the selectable actions stored in the populated database of selectable actions, wherein at least some of the selectable actions require the video display device to electronically communicate with an entity external to the video display device.

Figure 1B:
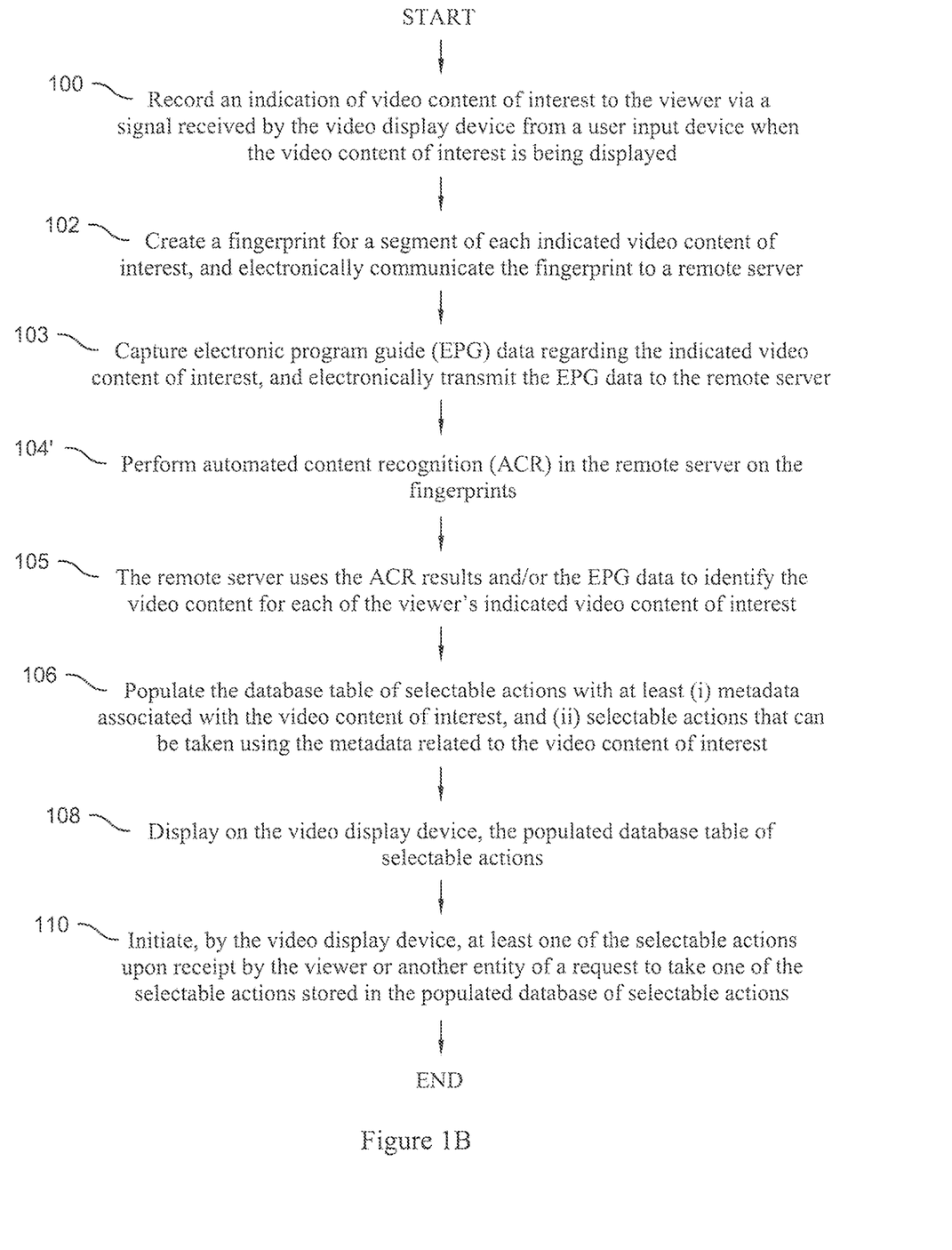

FIG. 1B shows a flowchart of another preferred embodiment of the present invention. This embodiment is similar to the embodiment of FIG. 1A, except that it incorporates EPG data into the process for identifying the indicated content of interest. Thus, there is an additional STEP 103: Capture, by the video display device, EPG data regarding the indicated video content of interest, and electronically transmit the EPG data to the remote server.

STEP 104 of FIG. 1A is modified as STEP 104' to include just the first part of step 104, namely, "Perform ACR in the remote server on the fingerprints."

New STEP 105 replaces the second part of STEP 104. STEP 105: The remote server uses the ACR results and/or the EPG data to identify the video content. In one preferred embodiment, the remote server uses the EPG data to identify the video content when the video content cannot be properly identified using ACR.

The remaining steps in FIG. 1B are identical to the corresponding steps of FIG. 1A.

III. Detailed Disclosure of Preferred Embodiments

Figure 2A:
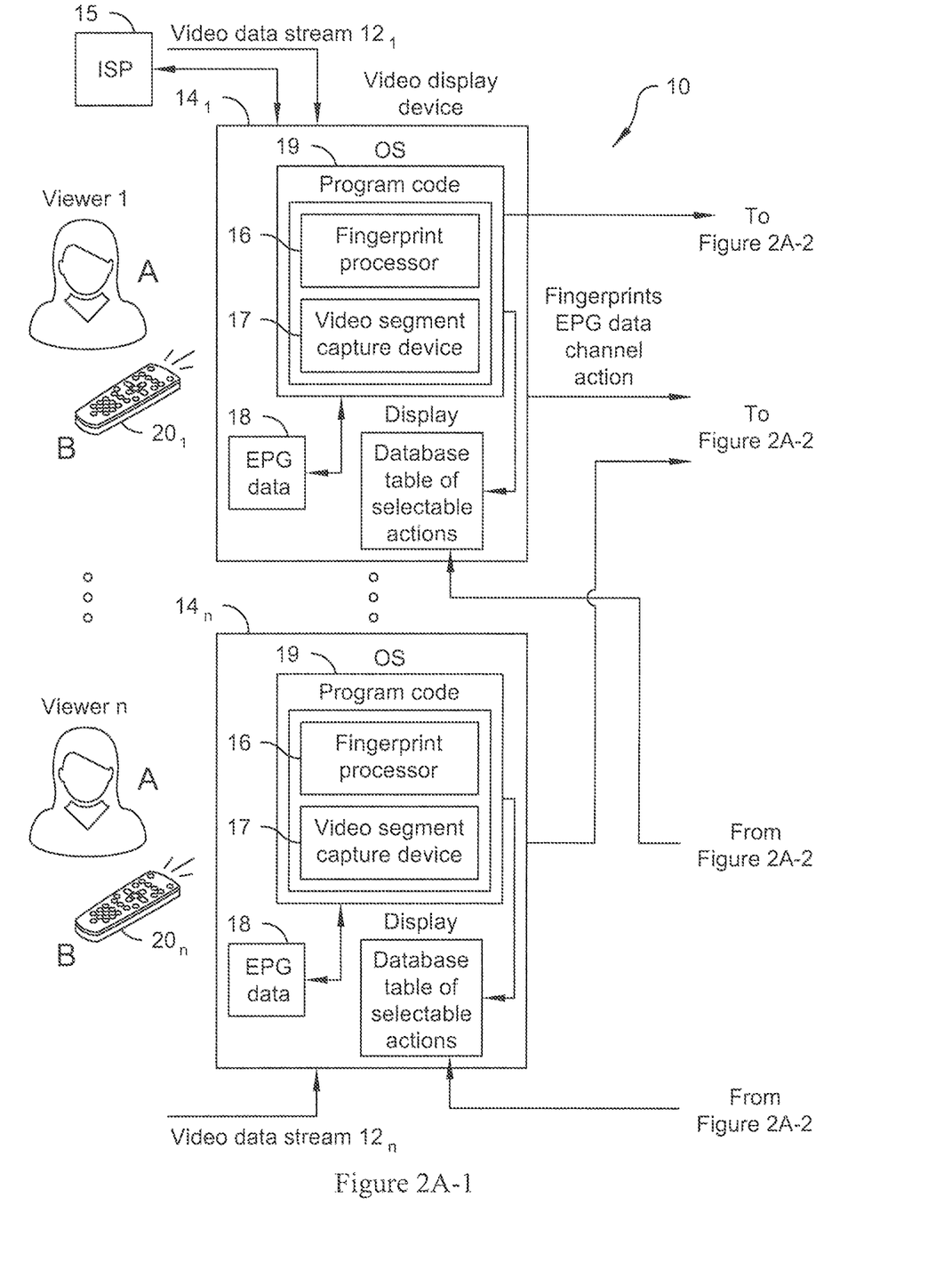
Figure 2A:
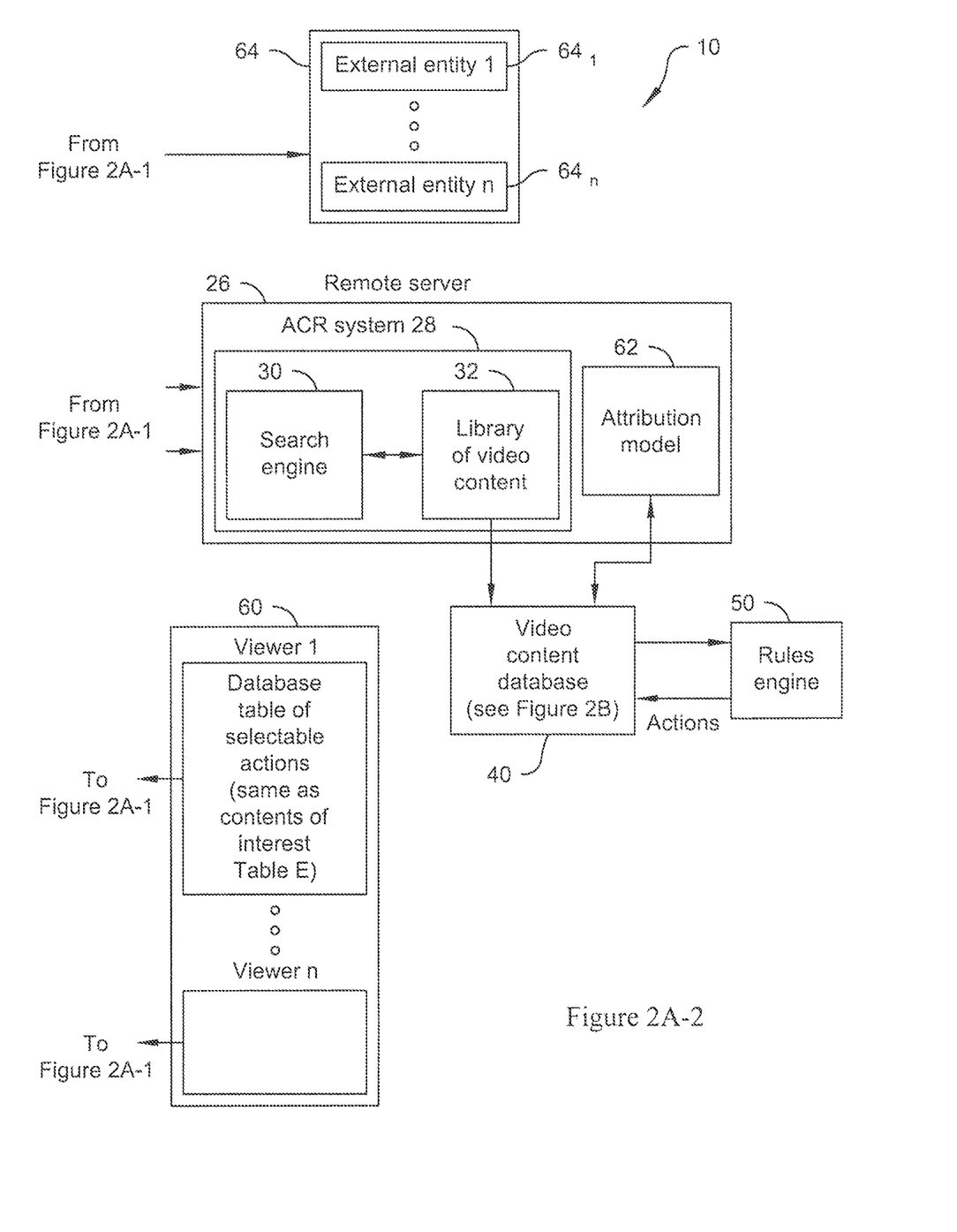

FIGS. 2A-1 and 2A-2, taken together, is a schematic diagram of a system 10 for implementing one preferred embodiment of the present invention, including the processes of FIGS. 1A and 1B. A TV channel feed or streaming media feed (hereafter, collectively referred to as a "video data stream 12") is received by a video display device 14. As described above, the video display device 14 may be a smart TV, or a smart multi-media player device, such as a tablet or a smartphone. The video display device 14 may interface with one or more intermediary devices (not shown), such as a set top box (STB), CableCARD®, or the like for receiving a broadcast TV signal as the video data stream 12, or a streaming media device or app, such as ROKU®, Hulu®, or Netflix®, for receiving video data as the video data stream 12 from a streaming service (not shown). In another embodiment, the functionalities of the one or more intermediary devices are built into the video display device 14, as is well-known in the art with respect to many types of smart TV's.

FIGS. 2A-1 and 2A-2 shows a plurality of viewers 1-*n*, each controlling their respective video display devices 12$_1$-12$_n$ with their respective user input devices 20$_1$-20$_n$. The explanation below is provided with respect to viewer 1, but it should be understood that each viewer has similar functionality as viewer 1.

The video display device 14 includes a fingerprint processor 16, and, optionally, EPG data 18 that is captured from a conventional electronic program guide (not shown) which is available from the source of the video data stream 12, such as a cable service provider, or independent third-party sources, such as tvguide.com. As is well-known in the art, the fingerprint processor 16 may be used to create one or more fingerprints from a segment of video content. The fingerprints may be audio and/or video fingerprints.

The video display device 14 also includes a connection to an Internet Service Provider (ISP) 15, or an equivalent entity for accessing resources that may be required by a smart appliance, and for accessing sources of EPG data. In most households that subscribe to a cable TV service, the ISP 15 is bundled into the subscription package.

The system 10 further includes a remote server 26 that receives the fingerprints generated by the fingerprint processor 16. The remote server 26 includes an automatic content recognition (ACR) system 28 which is configured to perform ACR on the received fingerprints. As is well-known in the art, the ACR system 28 includes search engine 30 and library of video content 32. The search engine 30 compares the received fingerprints to previously stored fingerprints of video content in the library of video content 32. When, or if, a match is found, the exact content associated with the fingerprint is identified. The search engine 30 is well-known in the art, and thus is not described further. See, for example, the discussion of a search engine in U.S. Pat. No. 10,108,718 (Kalampoukas et al.), which is incorporated by reference herein. While the search engine of U.S. Pat. No. 10,108,718 also interacts with a library of video content, this library does not include anything equivalent to the selectable actions described herein.

In an alternative embodiment (not shown), the fingerprint processor 16 is located in the ACR system 28 of the remote server 26. In this embodiment, the segment of video content (or a sampled portion thereof) is captured by segment capture device 17 located in the video display device 14, and is electronically communicated from the video display device 14 to the fingerprint processor 16 in the ACR system 28 of the remote server 26, and the same content recognition processing occurs as described above in the ACR system 28. This alternative embodiment requires additional bandwidth because transmitting fingerprints take up less bandwidth than transmitting video content segments. However, this embodiment may be preferred if it is not possible, or if it is logistically difficult, to install the fingerprint processor 16, or execute fingerprint processing, in the video display device 14.

The system 10 further requires the use of the user input device 20, which is preferably a conventional remote control device that receives input from the viewer via at least one of physical touch and voice commands. However, the user input device 20 includes additional functionality that is not part of a conventional remote control device. Specifically, the user input device 20 includes functionality to capture an indication of video content of interest to the viewer by pressing a pre-designated button or series of buttons, or by speaking a pre-designated word or sequence of words. For example, if the viewer is watching a particular TV program or commercial, and has a particular interest in the TV program or the commercial, the viewer makes the appropriate input into the user input device 20.

The purpose of capturing an indication of video content of interest to the viewer is to quickly and efficiently record that interest, and then to allow the viewer to take selected actions based on metadata related to the video content at a later point in time. The selected actions are presented on the video display device 14 upon request by the viewer of the previously recorded video contents of interest. This process thus differs from certain conventional interactive TV features wherein actions to be taken based on video content must occur concurrently with the viewing of the video content, such as when using interactive overlay technology, and the available actions are not based on metadata related to the video content, but are typically hard-coded actions.

Figure 2B:
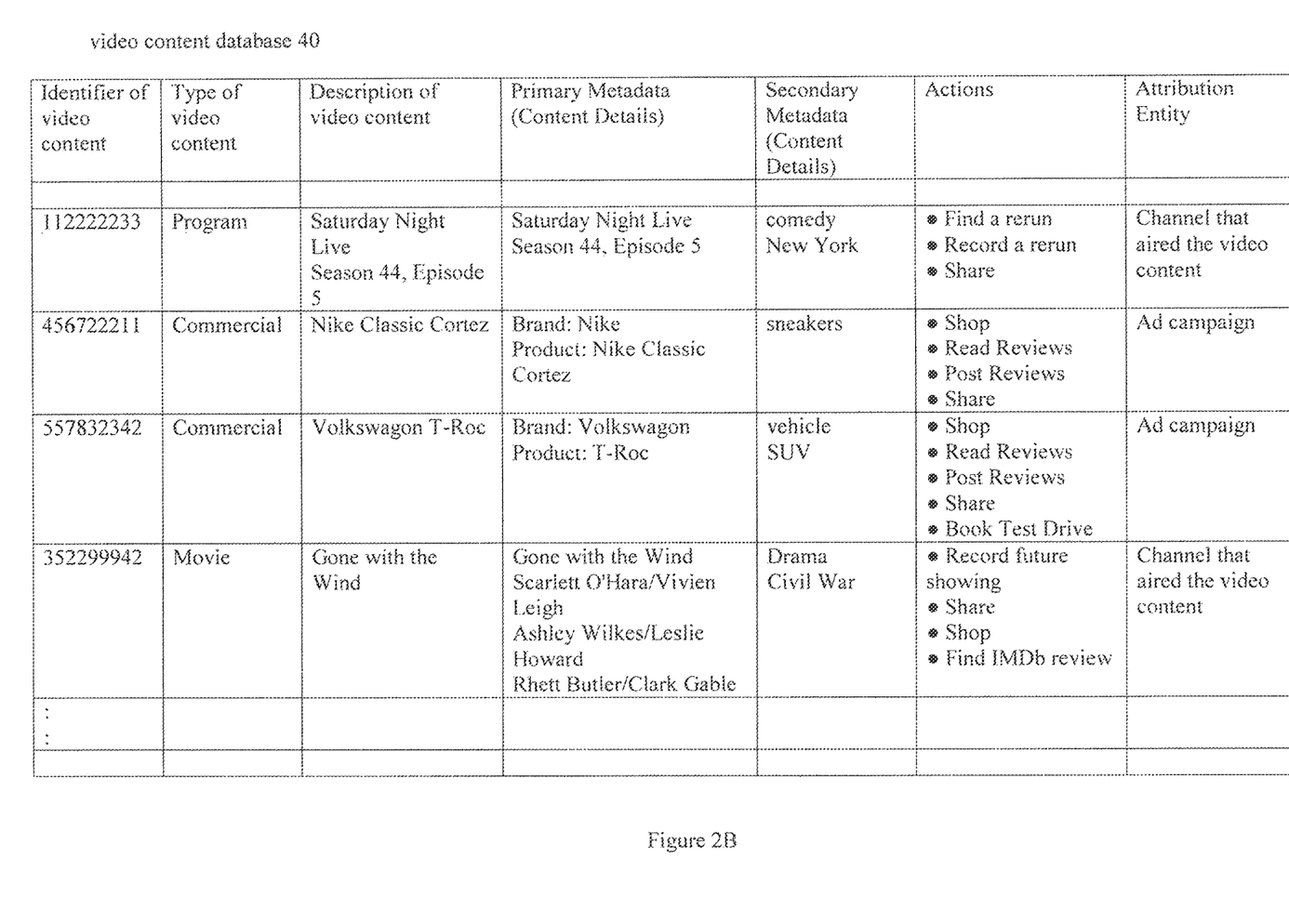
FIG. 2B is a database table used in the system of FIGS. 2A-1 and 2A-2.

The system 10 further includes video content database 40. FIG. 2B shows sample contents of the video content database 40, which includes at least the following fields:

i. An identifier of video content that is broadcast or streamed to video display devices 14. The identifier may be designated by the indexer or by the source of the video content. Preferably, the library of video content 32 includes similar identifiers as the identifiers of video content in the video content database 40 so that any video content that a viewer indicates as being of interest will be identifiable and will potentially have associated actions that can be taken. The library of video content 32 may be used to populate certain fields of the video content database 40.

ii. Type of video content (e.g., program, commercial, movie)

iii. Description of video content. For a program, this would typically include the name of the program, and the season and episode in the case of a recurring TV program series. For a movie, this would typically include the name of the movie. For a commercial, this would typically include the name and product being advertised.

iv. Primary Metadata (Content Details)

v. Secondary Metadata (Content Details)

vi. Actions

The system 10 further includes a rules engine 50 that is used to populate the "Actions" field of the video content database 40. Different actions are relevant to different types of content (content-type), different types of products (product-type), and different brands (brand-type). Actions which may be relevant to the content-type (e.g., commercial, song, movie, TV program, news) include finding a rerun, and recording a rerun. Actions which may be relevant to the product-type (e.g., women's apparel, kids toys, Doctor's office, insurance, amusement park, Uber®) including buying tickets, making an appointment, finding an online-sale, and calling a telephone number on the screen. Actions which may be relevant to the brand-type (e.g., BMW®, Hyundai®) include having a sales representative call, and booking a test drive.

To build a list of actions for specific video content (identified by its Identifier), the rules engine 50 receives information regarding the video content, including the content-type and the metadata (both primary and secondary) and generates the list of all possible actions that can be taken for the video content. Sample rules in the rules engine 50 may include:

IF content-type=commercial, THEN actions=[shop, read review, and post reviews]

IF content-type=TV program, THEN actions=[find a rerun, record a rerun]

IF metadata=vehicle, THEN actions=[book a test drive]

The rules in the rules engine may be customized by particular owners of video content. For example, a particular amusement park (e.g., Six Flags®) may want a special action that is provided only when that particular amusement park is shown in a commercial, as follows:

IF content-type=commercial, AND metadata=Six Flags, THEN actions=[Receive a discount offer]

Similarly, a TV program may have one or more customized actions. For example:

IF content-type=TV program, AND metadata=Saturday Night Live, THEN actions=[Request ticket to appear in live audience]

These customized actions are provided in addition to the default actions for actions when Content-type=commercial, or Content-type=TV program.

The final list of all actions is formed by aggregating all possible actions based on the data in the other fields of the video content database 40.

Figure 3:
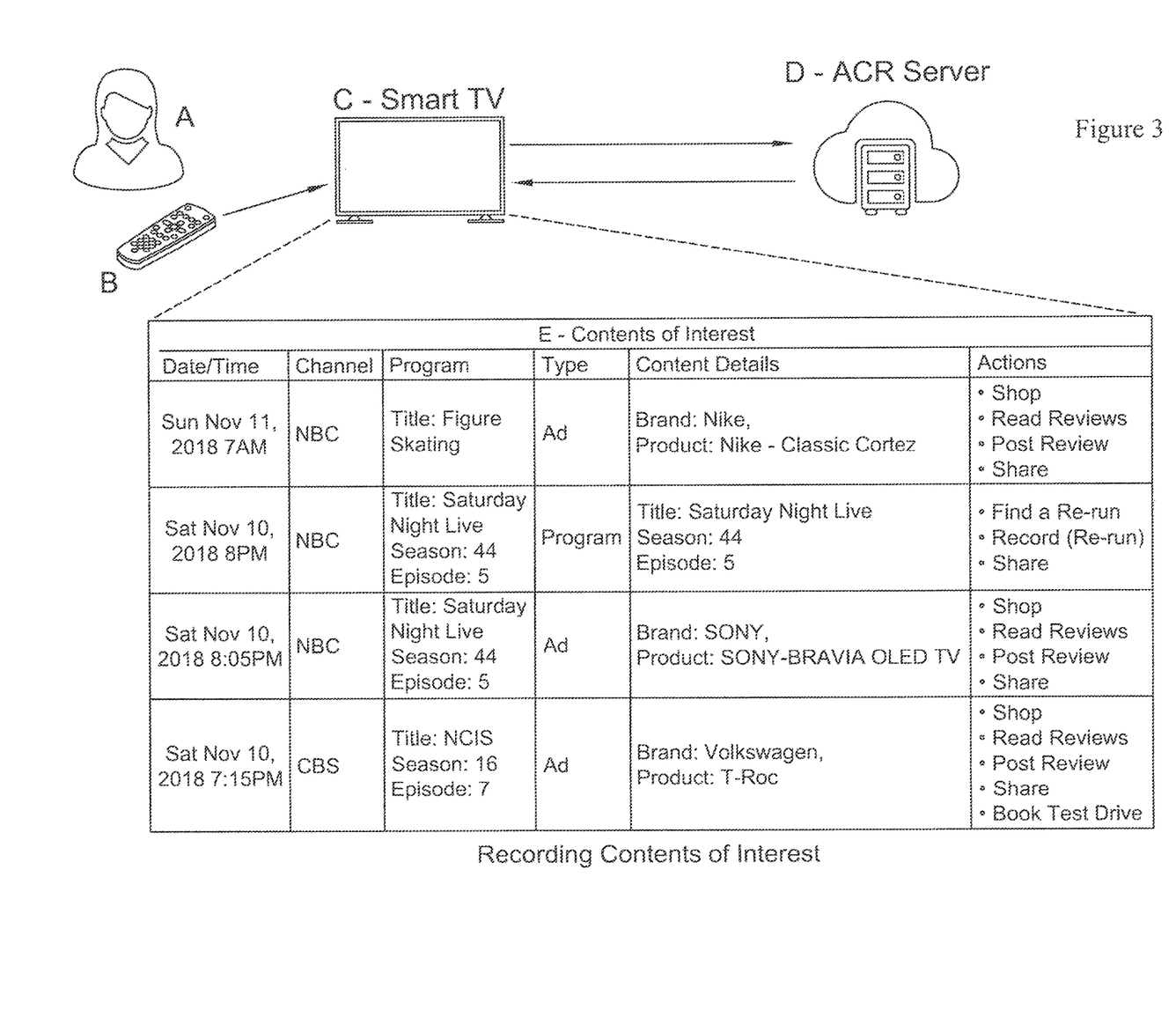
FIGS. 3 and 4 are additional schematic diagrams of the system in FIGS. 2A-1 and 2A2.

The system 10 further includes a database table of selectable actions 60 (also, interchangeably referred to herein as a "Contents of Interest table 60") for each viewer 1-n. A sample database table of selectable actions 60 for viewer 1 is shown in FIG. 3 (labeled as E-Contents of Interest). The Contents of Interest table 60 is initially empty, and becomes populated with data by the following steps for recording contents of interest:

1. The viewer (user A) interacts with the user input device 20 (device B) to indicate that content being aired is of interest to the viewer.

2. The video display device 14 (e.g., C-smart TV) on which content is being played sends a sample of audio or video in the form of a fingerprint to the remote server 26 (e.g., D-ACR Server), which performs ACR using the ACR system 28.

3. The remote server 26 interacts with the video content database 40 to identify actions associated with the video content of interest.

4. The fields of the Contents of Interest table 60 may then be populated for the respective video contents of interest that were originally identified by the viewer.

In one preferred embodiment, the fields of the "Contents of Interest table 60" are as follows:

i. Date/Time (of aired or streamed video content)

ii. Channel (which may be a streaming source, such as Netflix)

iii. Program name iv. Program Type v. Content Details (at least primary metadata)

vi. Actions (selectable actions)

The Contents of Interest table 60 may be stored in a database of the remote server 26, or in its own separate remote database.

Figure 4:
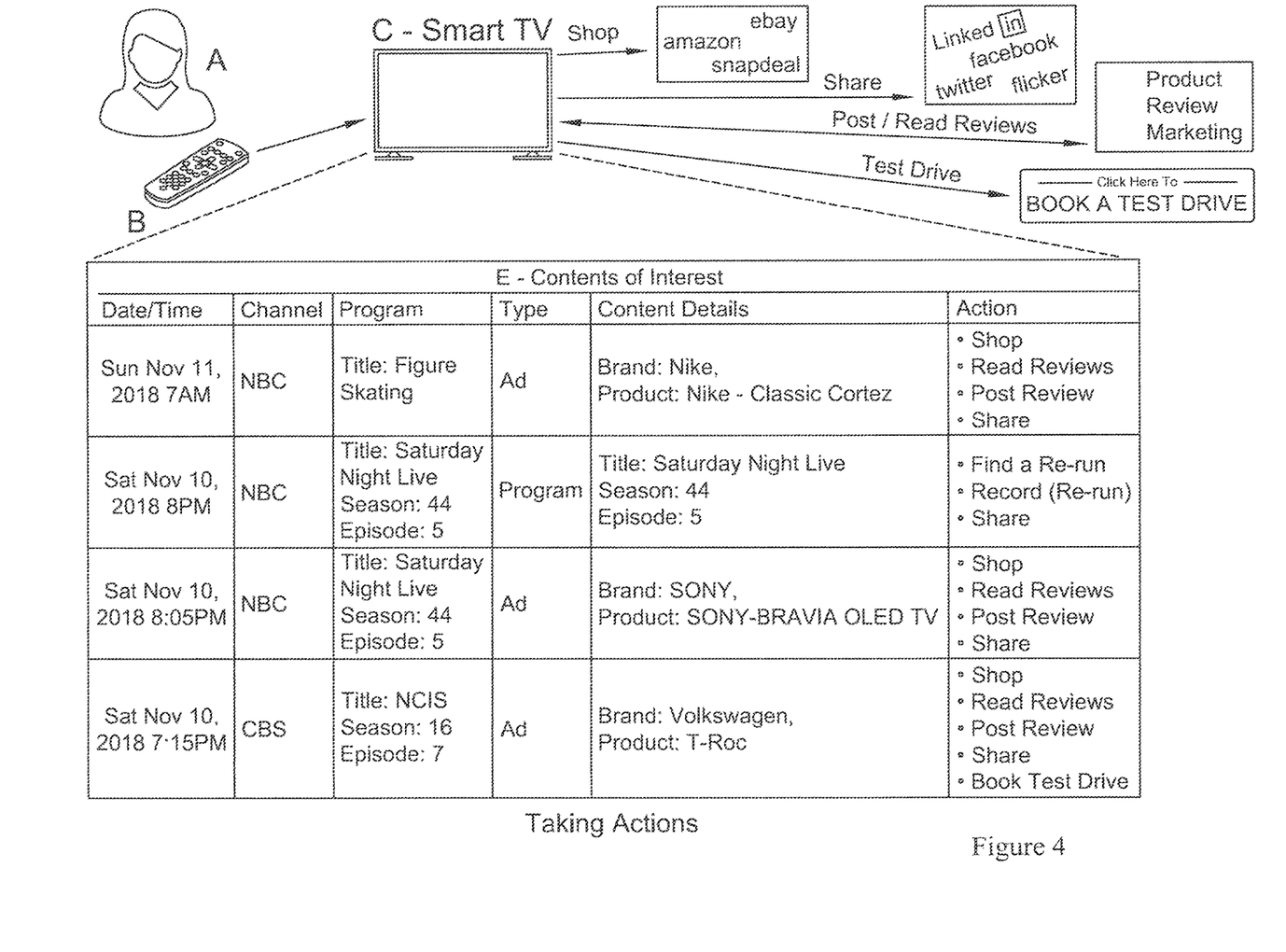

The same Contents of Interest table 60 is displayed to the viewer when the viewer wishes to view selectable actions, using the following process illustrated in FIG. 4:

1. The viewer (User A) interacts with the user input device 20 (device B) to access the Contents of Interest table 60 (again, labeled as E-Contents of Interest) in FIG. 4.

2. The video display device 14 (e.g., C-smart TV) displays the Contents of Interest table 60 (again, labeled as E-Contents of Interest).

3. The viewer (user A) selects a specific content-of-interest and takes one of the possible actions. Every action leads to execution of one or more steps such as accessing an e-retailer website to shop, accessing a social network website to post a comment, accessing a local car dealership's website to book an appointment for a test drive.

4. The system 10 also allows for attribution credit to be given to the Channel/Program/Ad-Campaign that led the viewer (User A) to take the action, as discussed in more detail below.

The fields of the Contents of interest table 60 are designed for ease of use by the viewer. In this manner, the viewer can quickly identify the video content that sparked their initial interest. While the Contents of interest table 60 in FIG. 4 shows all of the fields, certain fields may be suppressed for easier interaction by the viewer. For example, it is not necessary to show the program type or the channel. Likewise, if a viewer identified a particular commercial, it is not necessary (and probably not desirable) to display the program that the commercial aired on.

While the actions for each of the different video contents stored in the Contents of interest table 60 may have the same name (e.g., Shop), the implementation of the action uses the unique metadata associated with the respective table entry. Accordingly, different table entries will result in different outcomes.

Consider, for example, the first entry in the Contents of interest table 60 for the Nike Classic Cortez ad. Upon selection of the action to "Shop," the video display device 14 may open a browser that is pre-populated with keywords pulled from the metadata (e.g., "Nike Classic Cortez" and a word such as "purchase," "buy" or "shop." Alternatively, the video display device 14 may navigate directly to a predetermined website, such as Amazon® or eBay® having its search field similarly populated.

Consider, for example, the third entry in the Contents of interest table 60 for the SONY-BRAVIA OLED TV. Upon selection of the action to "Shop," the video display device 14 may open a browser that is pre-populated with keywords pulled from the metadata (e.g., "Sony Bravia OLED TV" and a word such as "purchase," "buy" or "shop." Alternatively, the video display device 14 may navigate directly to a predetermined website, such as Amazon® or eBay® having its search field similarly populated.

Consider, for example, the second entry in the Contents of interest table 60 for Saturday Night Live, Season 44, Episode 5. Upon selection of the Action "Find a rerun," an EPG may be searched using the metadata as keywords, and if the TV program is located, a prompt may be set for the viewer. If "Record a rerun" is set, then the viewer's DVR (which may be local or remotely located at the viewer's service provider) may be set to automatically record the TV program when it is aired next, and a prompt may be set for the viewer, so that the viewer is informed of the recording.

Some actions may have highly customized interfaces that may be specific to a particular brand or product. Consider, for example, the fourth entry in the Contents of interest table 60 for the Volkswagon T-Roc. Upon selection of the action to "Book Test Drive," the video display device 14 may open a browser that navigates directly to a VW interface that includes a radio button to book a test drive. The knowledge of where to navigate to may be embedded in the selectable action of "Book Test Drive," as opposed to being generated from the metadata in the Contents of interest table 60. In one embodiment, the rules engine 50 inserts an embedded link into the selectable action of "Book Test Drive" using a more refined rule than the one described above for this action, such as: IF metadata=vehicle, THEN action=book a test drive, AND IF metadata=Volkswagon, THEN embed VW test drive link into action=book a test drive. In this manner, different vehicle manufacturers may embed their own customized links into the action of booking a test drive, thereby bringing the viewer to a completely different customer interface for each vehicle manufacturer. Similar types of embedded links may be used for other actions. These embedded link embodiments still make use of the metadata for the video content. However, the metadata is used at a different stage in the process, namely, when building the action items in the video content database, as opposed to when a viewer selects an action.

As described above, at least some of the selectable actions require the video display device 14 to electronically communicate with an entity external to the video display device 14. These external entities 1–n are shown in FIGS. 2A-1 and 2A-2. If the action involves an e-commerce transaction, a social media posting, or an internet or worldwide web-type search function (e.g. GOOGLE search), the external entity would typically be a web server associated with the service that the viewer interacts with to perform the action. Some actions may not require communicating with an external source, depending upon how well integrated support services are with respect to the video display device. For example, large quantities of EPG data can sometimes be downloaded onto a viewer's local device. If a viewer selects an action to Record a rerun, the EPG data may be searched locally for a rerun. However, searching large volumes of EPG data typically requires that the video display device 14 communicate with an externally located server of the service provider, which is an "external entity," as described herein. While there are limited types of actions that may not require the video display device 14 to electronically communicate with an external entity, most selectable actions will require some type of communication with an external entity.

Preferably, the Contents of Interest table 60 is displayed to the viewer only when the viewer wishes to view selectable actions. However, in an alternative embodiment, a portion of the display screen real estate may be dedicated to a continuous display of the most updated version of the Contents of Interest table 60.

A. Additional Viewer Customization Regarding Actions

When building the list of actions, certain actions require knowledge of the viewer's video content subscription services. For example, an action to "Find the same movie on Netflix" would preferably only appear if the viewer has a Netflix subscription. Thus, while the rules engine 50 may output that action to the video content database 40 whenever content-type=movie, this action would preferably be suppressed for viewers who do not have a Netflix subscription. This information may be tracked within the video display device 14 (e.g., C-smart TV) which can then keep or remove that action, accordingly, when displaying the Contents of Interest table 60. Likewise, an action such as "Prompt if the same TV show/episode is scheduled again on any of channels that I subscribe to" necessarily requires knowledge of the viewer's subscribed channels. While this action would not need to be suppressed for any viewers, if the viewer selects this action, and a particular network is airing that TV show/episode, any resultant prompting will require comparing the viewer's subscribed channels to the channel of the scheduled (soon-to-be-aired) TV show/episode so that only viewers who receive that network are prompted.

B. On-the-Fly Action Creation

In one preferred embodiment described above, the actions are created using the rules engine 50 and prestored in the video content database 40. The same actions are then used to populate the Contents of interest table 60 for the individual viewers based on their respectively identified contents of interest.

In an alternative embodiment, no actions are prestored in the video content database 40, nor are any actions prestored in the Contents of interest table 60. Instead, whenever a viewer accesses the Contents of interest table 60 to view their previously identified video contents of interest, and view the associated selectable actions, the selectable actions are created on-the-fly from the metadata and other video content information in the same manner as they are created using the rules engine 50. If sufficient processing speed is available to generate the actions, the viewer would not likely experience any difference in the speed in which the Contents of interest table 60 is presented on the video display device 14.

C. Use of EPG Data Instead of, or in Addition to, ACR Process for Identification of Video Content Other than Commercials In one preferred embodiment of the present invention, the fingerprint processor 16 and the ACR system 28 (collectively, referred to herein as "the ACR process") work together to identify any aired or streamed video content that the viewer indicates as being of interest.

In an alternative embodiment, certain video content of interest is identified by accessing EPG data 18 from the viewer's service provider or a third-party source, and using the EPG data 18, instead of the ACR process. There are numerous advantages and disadvantages to this approach.

The main advantage of using EPG data is that the ACR process is processor-intensive and requires maintaining a large database of video content in the library 32 so that the ACR system 28 can accurately identify whatever video content that the viewer indicates as being of interest, whereas the EPG data requires only a simple lookup function.

However, using only EPG data has disadvantages. For example, EPG data does not indicate when commercials are played, nor does EPG data indicate what commercials are played. Thus, if a viewer indicates interest in a Nike ad during a figure skating show, the system 10 will incorrectly presume that the viewer is interested in the figure skating show, and will subsequently present the wrong set of actions to the viewer. Being able to indicate interest in products and brands shown during commercials is a particularly useful application of the present invention, so removing this functionality is not preferred. Also, EPG data cannot identify on-demand streaming video content. However, if the viewer is aware that the system 10 only works with aired (broadcasted) TV programming, and not commercials or streaming services, use of the EPG guide may be an acceptable substitute for the ACR process, particularly if the EPG data is readily available and reasonably accurate most of the time.

In another alternative embodiment, EPG data and the ACR process are used together in the following manner:

1. The library of video content 32 maintains only commercial content, thereby significantly reducing its size. Thus, the ACR system 28 is limited to only identifying commercials. Libraries of such video content are well-known in the art. See, for example, U.S. Pat. No. 9,628,836 (Kalampoukas et al.), which is incorporated by reference herein.

2. When the viewer indicates that particular video content being watched is of interest, both EPG data and a fingerprint are sent to the remote server 26. If the ACR system 28 can properly identify the fingerprint, then the content of interest is presumed to be the identified commercial. If the ACR system cannot properly identify the fingerprint, then the content of interest is presumed to be whatever program is indicated from the EPG data.

Incorrect identification would occur in a few situations, such as when a commercial is missing from the library 32, or when the EPG data is incorrect, or when the video content is from a streaming media source that has no associated EPG. However, this hybrid system would likely capture most scenarios because virtually complete libraries of commercials are available today, and EPG data is highly reliable. Other methods are available to address identification of streaming video content. Alternatively, if the video content is from a streaming source, EPG data may be suppressed, and thus no identification of video content would occur, and no entry will appear in the Contents of interest table 60 for that video content. A few missing entries over the course of months of time would not likely be noticed by the viewer.

This alternative embodiment is also advantageous for identifying, via the EPG data, program content that is not indexed, or cannot be indexed, into the library of video content 32. A significant percentage of program content is live (e.g., sports, news), or has never been previously aired or streamed. This program content is thus not available to index into the library of video content 32. If only the ACR system 28 was relied upon for matching, identification of this type of video content of interest would not be possible.

In yet another alternative embodiment, the library of video content 32 maintains commercial content, and limited program content. This alternative embodiment works in a similar manner as the previously described alternative embodiment, namely, when the viewer indicates that particular video content being watched is of interest, both EPG data and a fingerprint are sent to the remote server 26. If the ACR system 28 can properly identify the fingerprint, then the content of interest is presumed to be the identified commercial or program content. If the ACR system cannot properly identify the fingerprint, then the content of interest is presumed to be whatever program is indicated from the EPG data. This embodiment has numerous advantages over the previously described embodiments. First, the library of video content 32 maintains only commercial content and limited program content, thereby reducing its size, compared to an embodiment wherein all available program content is placed in the library of video content 32. Second, any program content that is not present in the library of video content 32, and thus cannot be identified using the ACR system 28, would still be identified from the EPG data.

In yet another embodiment, if the video content of interest is identified by the ACR system 28 and is program content, not a commercial, the EPG data may be used to verify the correctness of the identification. If there is any discrepancies between the identified program content, the rules engine 50 includes rules to decide which information should be used (i.e., the results of the ACR system 28, or the EPG data).

The EPG data 18 shown in FIGS. 2A-1 and 2A-2 may represent locally stored EPG data, or EPG data that is being accessed in real-time from the viewer's service provider.

D. Action Attribution

The system 10 also allows for attribution credit to be given to the Channel/Program/Ad-Campaign that led the viewer to take the action. This functionality is particularly useful for e-commerce applications where items are being purchased and attribution modeling is embedded in the system 10 using attribution model 62. An attribution model is how credit or value is assigned for sales and conversions across various customer touchpoints. Attribution may be given to various entities in the system 10 as follows:

1. Channel that aired the video content (e.g., NBC, CBS, as recorded in the Contents of interest table 60)

2. Program that was being watched (e.g., Saturday Night Live, as recorded in the Contents of interest table 60)

3. Ad campaign (e.g., using video content identifier for Nike Classic Cortez, or Volkswagon T-Roc, obtained from the video content database 40. The ad campaign may also be defined by ad agencies based on the date, time, channel, and program that the ad appeared on.)

Attribution models are well-known in the art and thus are not described further herein. Examples of attribution models that are suitable for use in the present invention, or which can be easily modified for use in the present invention, are described in U.S. Patent Application Publication Nos. 2018/0232264 (Curcio et al.); 2017/0372347 (Li et al.); 2017/0337276 (Obenzinger); 2017/0213237 (Yadagiri); and 2015/0161658 (Little et al.), each of which is incorporated herein by reference.

In one embodiment, the video content database 40 maintains video content attribution data that identifies an attribution entity to receive attribution credit for particular video content. When a viewer takes one of the selectable actions, the video display device 14 communicates that action to the remote server 26. The attribution model 62 then obtains the attribution entity from the video content database 40 and assigns the appropriate attribution credit.

E. Data being Communicated from the Video Display Device 14 to the Remote Server 26

Referring again to FIGS. 2A-1 and 2A-2 and the various alternative embodiments described above, the types of data that may be communicated from the video display device 14 to the remote server 26 include at least the following data:

1. Fingerprints of the video content of interest, or a segment of video content (or a sampled portion thereof) of interest, in the case where the fingerprint processor 16 is located in the ACR system 28 of the remote server 26. As discussed above, there are some embodiments wherein neither of these items are collected or communicated, such as when the EPG data is the sole source of information regarding the video content being watched. However, since commercials cannot be properly identified with only the EPG data, preferred embodiments create and use fingerprints as the primary or sole method of identifying at least commercials in the video content. As also described above, fingerprints, in conjunction with the EPG, may be used to identify the video content.

2. EPG data, if fingerprints are not used as the primary or sole method of identifying the video content. A smart TV can identify the EPG data that is currently being viewed. In fact, an EPG is often used to directly select the channel being viewed.

3. Channel (which may be a streaming source, such as Netflix). In some embodiments, the source of the video content is extracted from the video display device 14. For example, the channel that an STB is tuned to may be communicated to the remote server 26. Alternatively, if a smart TV is showing a streaming movie from Netflix, the smart TV can communicate that fact to the remote server.

4. Actions selected by the viewer for use in the attribution model 62.

F. Operating System (OS) of Video Display Device 14

As discussed above, smart TVs and smart multi-media player devices run a complete operating system (OS) or mobile OS software that provides a platform for application developers. In one preferred embodiment of the present invention, the advanced functions of the video display device 14, such as recording an indication of video content of interest to the viewer, creating fingerprints, capturing video segments, capturing EPG data, displaying the populated database table of selectable actions, and initiating selectable actions, are implemented by program code (computer code) within its OS, labeled as OS 19 in FIGS. 2A-1 and 2A-2.

G. Viewer System Identification

Since each viewer has their own Contents of Interest table 60, the system 10 must provide some way of identifying the viewer so that the correct Contents of Interest table 60 is populated when a viewer makes an indication of video content of interest. This can be implemented in any number of ways, which can be either passive or active. For example, one passive approach is for the remote server 26 to receive a unique device identifier of the video display device 14, and then create a Contents of Interest table 60 for each unique device identifier. One active approach would require login credentials to be inputted by the viewer when interacting with the video display device 14. These credentials are passed on to the remote server 26, and each Contents of Interest table 60 would then be associated with the viewer's login credentials. The active approach is more burdensome for the viewer (viewers do not typically log into a smart TV), but it would allow the Contents of Interest table 60 to work across multiple video display devices 14. Since the passive approach cannot distinguish among viewers of the same video display device 14, the Contents of Interest table 60 will include entries from all of viewers of the same video display device 14, and thus actions can be taken by any entity who interacts with the same video display device 14, regardless of whether or not that entity caused particular table contents to be populated.

In another passive approach, a plurality of video display devices 14 within a single household may be associated with a single viewer account. That is, one viewer account may include the unique device identifiers of multiple video display devices within a single household. The registration process may automatic, such as by detecting all video display devices 14 that are connected to the same wifi network that is part of a service provider's cable package, or the registration process may require manual user registration. Upon completion of the registration process, the Contents of Interest table 60 for the household is populated whenever a viewer makes an indication of video content of interest from any of the registered video display device 14 in the household. Likewise, the same Contents of Interest table 60 appears on the display screens of all of the registered devices within the same household.

H. Audio-Based Media Content

While the preferred embodiments are described in the context of viewers, video content, video display devices, and video segments, the scope of the present invention also includes audio-only-based media content. In an audio-based embodiment, the viewer is a media consumer, the video content is media content, the video display device is a media device, the video segments are media segments, the video data stream is a media data stream, and the video content database is a media content database. Audio-based embodiments function in a similar manner as video-based embodiments, and only the descriptive verbiage needs to be substituted in the explanations above.

The present invention may be implemented with any combination of hardware and software. If implemented as a computer-implemented apparatus, the present invention is implemented using means for performing all of the steps and functions described above.

When implemented in software, the software code for the fingerprint processor 16, remote server 26, search engine 30, rules engine 50, and attribution model 62 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above. The storage media may also be implemented via network storage architecture, wherein many devices, which are paired together, are available to a network.

The computer(s) used herein for the fingerprint processor 16, remote server 26, search engine 30, rules engine 50, and attribution model 62 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

At least the fingerprint processor 14 and the search engine 30 are not general-purpose computers, but instead are specialized computer machines that perform a myriad of video processing and search functions that are not native to a general-purpose computer, absent the addition of specialized programming.

The fingerprint processor 16, remote server 26, search engine 30, rules engine 50, attribution model 62, video display devices $14_1$-$14_n$, video content database 40, and database table of selectable actions 60 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of creating a media consumer-personalized database table of selectable actions related to media content of interest to a media consumer that is being displayed on a media device, and using the database table of selectable actions to initiate an action, wherein a media content database maintains (i) an identifier of media content that is broadcast or streamed to a plurality of media devices, and (ii) metadata associated with the media content, the method comprising:

(a) recording, by the media device, an indication of media content of interest to the media consumer via a pre-designated input received by the media device from a user input device when the media content of interest is being displayed;

(b) creating a fingerprint, by a fingerprint processor, for a segment of each indicated media content of interest, and electronically communicating the fingerprint to a remote server;

(c) performing automated content recognition (ACR) in the remote server on the fingerprints, the remote server thereby identifying the media content for each of the media consumer's indicated media content of interest by its respective identifier;

(d) populating, by the remote server that is in electronic communication with the media content database, the database table of selectable actions with at least the following items for each indicated media content of interest:

(i) the metadata associated with the media content of interest, and (ii) selectable actions that can be taken using the metadata related to the media content of interest, wherein the selectable actions are based on the metadata related to the media content of interest, thereby allowing different selectable actions to be taken for different media content of interest, and wherein the database table of selectable actions is populated with the metadata and associated selectable actions for a plurality of different media content of interest;

(e) displaying in a single display screen, on the media device, the populated database table of selectable actions for the plurality of different media content of interest, wherein the single display screen shows the plurality of different media content of interest, and their respective selectable actions; and (f) initiating, by the media device, at least one of the selectable actions upon receipt by the media consumer or another entity of a request to take one of the selectable actions, wherein at least some of the selectable actions require the media device to electronically communicate with an entity external to the media device to perform the selectable actions, and wherein steps (e) and (f) occur at a later point in time than step (a).

2. The method of claim 1 wherein the media content database further maintains:

(iii) media content attribution data that identifies an attribution entity to receive attribution credit for particular media content, the method further comprising:

(g) providing attribution credit to the respective attribution entity, using the media content attribution data, upon initiation of a selectable action for the particular media content.

3. The method of claim 1 wherein the selectable actions use the metadata to initiate the request.

4. The method of claim 1 wherein the media device includes an operating system, and wherein at least steps (a), (e) and (f) are performed using the operating system of the media device.

5. The method of claim 1 wherein the media device is one of a smart television, and a smart multi-media player device.

6. The method of claim 1 wherein the user input device is a remote control that receives input via at least one of physical touch and voice commands.

7. The method of claim 1 wherein the fingerprints are one or more of audio and video fingerprints.

8. The method of claim 1 wherein the selectable actions depend, in part, upon the type of media content.

9. The method of claim 1 wherein the media content database further maintains (iii) the selectable actions that can be taken using the metadata related to the media content, and wherein the selectable actions in the database table of selectable actions are obtained from the selectable actions in the media content database.

10. The method of claim 1 wherein the selectable actions in the database table of selectable actions are created on-the-fly from at least the metadata associated with the media content.

11. The method of claim 1 wherein the fingerprint processor is in the media device, and wherein in step (b), the created fingerprint for the segment of each indicated media content of interest is electronically communicated by the media device to the remote server.

12. The method of claim 1 wherein the fingerprint processor is in the remote server, and the method further comprises:

(g) capturing, by the media device, a media segment of each indicated media content of interest, and electronically transmitting the segment to the remote server for creation of the fingerprint by the fingerprint processor in the remote server.

13. The method of claim 1 further comprising:

(g) capturing, by the media device, electronic program guide (EPG) data regarding the indicated media content of interest, and electronically transmit the EPG data to the remote server, wherein step (c) further comprises, the remote server also using the EPG data to identify the media content.

14. The method of claim 1 further comprising:

(g) capturing, by the media device, electronic program guide (EPG) data regarding the indicated media content of interest, and electronically transmitting the EPG data to the remote server, wherein step (c) further comprises, the remote server using the EPG data to identify the media content when the media content cannot be properly identified using ACR.

15. An automated system for creating a media consumer-personalized database table of selectable actions related to media content of interest to a media consumer that is being displayed on a media device, and using the database table of selectable actions to initiate an action, wherein a media content database maintains (i) an identifier of media content that is broadcast or streamed to a plurality of media devices, and (ii) metadata associated with the media content, the system comprising:

(a) program code in the media device configured to record an indication of media content of interest to the media consumer via a pre-designated input received by the media device from a user input device when the media content of interest is being displayed;

(b) a fingerprint processor configured to create a fingerprint for a segment of each indicated media content of interest; and (c) a remote server that is in electronic communication with the media content database, the remote server configured to:

(i) perform automated content recognition (ACR) on the fingerprints, the remote server thereby identifying the media content for each of the media consumer's indicated media content of interest by its respective identifier, and (ii) populate the database table of selectable actions with at least the following items for each indicated media content of interest:

(A) the metadata associated with the media content of interest, and (B) selectable actions that can be taken using the metadata related to the media content of interest, wherein the selectable actions are based on the metadata related to the media content of interest, thereby allowing different selectable actions to be taken for different media content of interest, and wherein the database table of selectable actions is populated with the metadata and associated selectable actions for a plurality of different media content of interest, the program code in the media device being further configured to:

(i) display, in a single display screen, on the media device, the populated database table of selectable actions for the plurality of different media content of interest, wherein the single display screen shows the plurality of different media content of interest, and their respective selectable actions, (ii) initiate at least one of the selectable actions upon receipt by the media consumer or another entity of a request to take one of the selectable actions, wherein at least some of the selectable actions require the media device to electronically communicate with an entity external to the media device to perform the selectable actions, and wherein the display of the populated database table of selectable actions and the initiation of at least one of the selectable actions occur at a later point in time than when the media content of interest to the media consumer is being displayed.

16. The system of claim 15 wherein the media content database further maintains:

(iii) media content attribution data that identifies an attribution entity to receive attribution credit for particular media content, the system further comprising:

(d) an attribution model configured to provide attribution credit to the respective attribution entity, using the media content attribution data, upon initiation of a selectable action for the particular media content.

17. The system of claim 15 wherein the selectable actions use the metadata to initiate the request.

18. The system of claim 15 wherein the media device includes an operating system, and wherein the program code executes in the operating system.

19. The system of claim 15 wherein the media device is one of a smart television, and a smart multi-media player device.

20. The system of claim 15 wherein the user input device is a remote control that receives input via at least one of physical touch and voice commands.

21. The system of claim 15 wherein the fingerprints are one or more of audio and video fingerprints.

22. The system of claim 15 wherein the selectable actions depend, in part, upon the type of media content.

23. The system of claim 15 wherein the media content database further maintains (iii) the selectable actions that can be taken using the metadata related to the media content, and wherein the selectable actions in the database table of selectable actions are obtained from the selectable actions in the media content database.

24. The system of claim 15 wherein the selectable actions in the database table of selectable actions are created on-the-fly from at least the metadata associated with the media content.

25. The system of claim 15 wherein the fingerprint processor is part of the program code of the media device, and the program code of the media device is further configured to:

(iii) electronically communicate the fingerprint to the remote server.

26. The system of claim 15 wherein the fingerprint processor is in the remote server, and the program code of the media device is further configured to:

(iii) capture a media segment of each indicated media content of interest, and electronically transmit the segment to the remote server for creation of the fingerprint by the fingerprint processor in the remote server.

27. The system of claim 15 wherein the program code of the media device is further configured to:

(iii) capture electronic program guide (EPG) data regarding the indicated media content of interest, and electronically transmit the EPG data to the remote server, wherein the remote server also uses the EPG data to identify the media content.

28. The system of claim 15 wherein the program code of the media device is further configured to:

(iii) capture electronic program guide (EPG) data regarding the indicated media content of interest, and electronically transmit the EPG data to the remote server, wherein the remote server uses the EPG data to identify the media content when the media content cannot be properly identified using ACR.

* * * * *